United States Patent
Hayashida et al.

[11] 3,922,657
[45] Nov. 25, 1975

[54] LOW LIQUID LEVEL WARNING DEVICE

[75] Inventors: Yoshihiro Hayashida, Chigasaki; Hiroyuki Suzuki, Kawasaki, both of Japan

[73] Assignee: Tokico Ltd., Kawasaki, Japan

[22] Filed: Dec. 18, 1974

[21] Appl. No.: 533,750

[30] Foreign Application Priority Data
Dec. 20, 1973 Japan.............................. 48-3428

[52] U.S. Cl............ 340/244 E; 73/DIG. 5; 73/308; 200/84 C; 340/59
[51] Int. Cl.².......................................... G08B 21/00
[58] Field of Search.............. 116/118 R, 109, 110; 340/244 E, 244 R, 244 A, 59; 73/307, 308, 311, 313, DIG. 5; 200/84 C; 137/558

[56] References Cited
UNITED STATES PATENTS

| | | |
|---|---|---|
| 3,140,606 | 7/1964 | Kramer et al........................ 73/313 |
| 3,680,044 | 7/1972 | Tsubouchi...................... 200/84 C |
| 3,691,522 | 9/1972 | Hocking et al. ...................... 340/59 |

Primary Examiner—S. Clement Swisher
Assistant Examiner—Marcus S. Rasco
Attorney, Agent, or Firm—Wenderoth, Lind & Ponack

[57] ABSTRACT

In a low liquid level warning device for use in a brake liquid reservoir supplying a tandem master cylinder in a vehicle hydraulic braking system, the improvement comprising: a partition wall dividing the interior of the reservoir into two chambers; a guide disposed in each of the two chambers for guiding a float, at least a portion of each guide extends from the bottom portion of the partition wall upwardly towards the center portion of each chamber in a declined manner; a lead switch disposed in the bottom portion of the partition wall; and a magnet for actuating the lead switch secured on each of the float.

6 Claims, 4 Drawing Figures

000
LOW LIQUID LEVEL WARNING DEVICE

BACKGROUND OF THE INVENTION

This invention relates to a low liquid level warning device and, more particularly, to the warning device for use in a brake liquid reservoir supplying brake liquid to a tandem master cylinder in a vehicle hydraulic braking system.

The arrangement of a known low liquid level warning device for use in a brake liquid reservoir in a vehicle braking system is such that a guide is provided along a vertical wall of the reservoir for guiding a float, thereby the float ascends and descends along with the liquid level in the reservoir and, actuates a lead switch disposed in the bottom portion of the vertical wall to issue a warning signal when the float descends to its lower extremity. However, when the arrangement is applied to a brake liquid reservoir which supplies brake liquid to a tandem master cylinder in a vehicle hydraulic braking system, in which the interior of the reservoir is divided into two chambers by a partition wall and the float for actuating a lead switch which is disposed in the bottom portion of the partition wall is arranged in each of the two chambers, there results a problem such that when a vehicle is inclined and so is the level of brake liquid in the reservoir, the float which is movable along the partition wall in the reservoir moves largely since variation in liquid level at the peripheral portion of the reservoir is larger than that at the center portion of the reservoir, whereby there is issued a erroneous warning signal when the float descends to its lower extremity, despite a sufficient amount of brake liquid being contained in the reservoir.

SUMMARY OF THE INVENTION

The present invention is directed to solving the aforesaid problem by providing an improved low liquid level warning device, in which the float in each of the chambers ascends or descends at the center portion of the chamber where the variation in liquid level is relatively small.

According to the invention, there provided a low liquid level warning device for use in a brake liquid reservoir supplying a tandem master cylinder or the like in a vehicle hydraulic braking system, said device comprises a lead switch disposed in the bottom portion of a partition wall dividing the interior of the reservoir into two chambers, a float disposed in each of said chambers and having a magnet thereon for actuating said lead switch, a guide disposed in each of the chambers for guiding the corresponding float, at least a portion of each guide extends from the bottom portion of the partition wall upwardly towards the center portion of each chamber in a declined manner, and a warning circuit connected to said lead switch.

The present invention will now be described in more detail in conjunction with the accompanying drawings which indicate a preferred embodiment of the invention.

DETAILED DESCRIPTION OF THE EMBODIMENT

Figure 1:
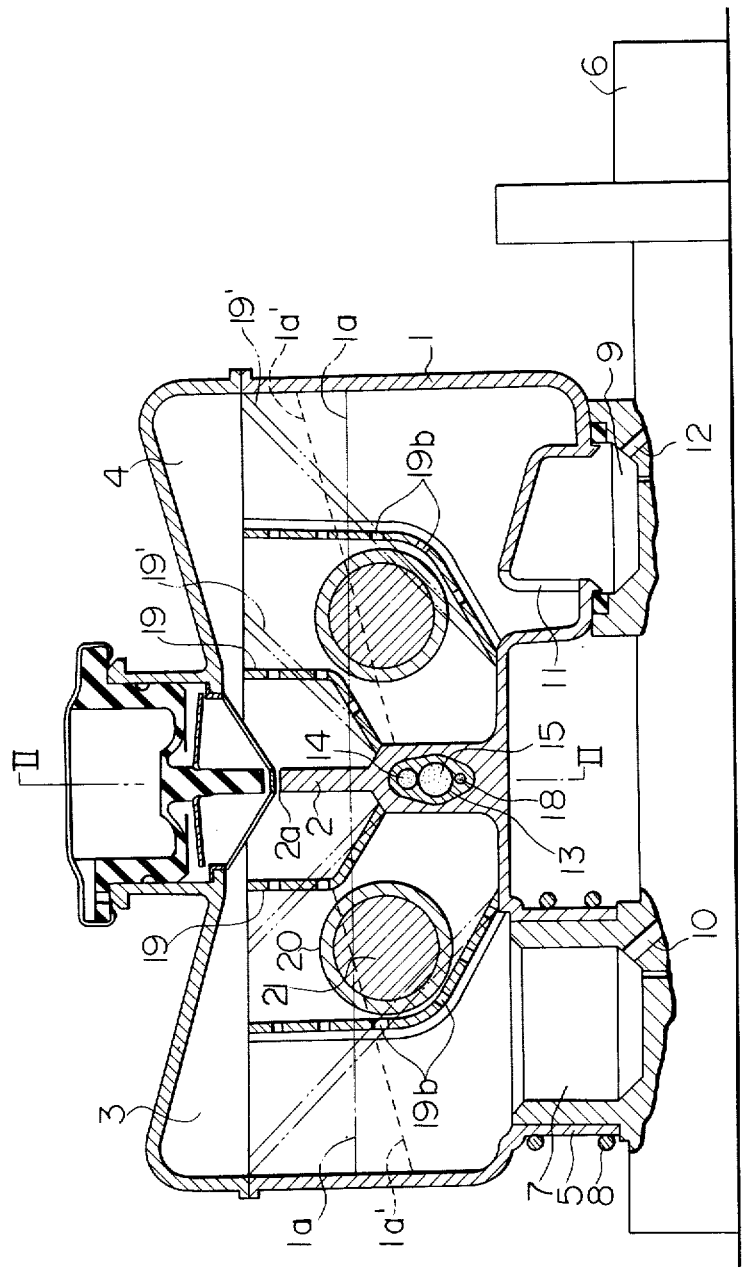
FIG. 1 is a longitudinal cross-section of one embodiment of the present invention.
Figure 2:
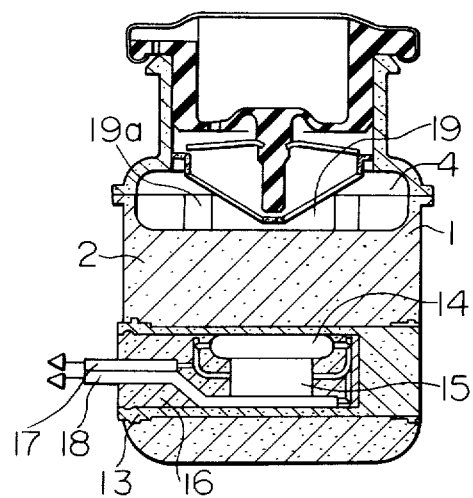
FIG. 2 is a cross-sectional view taken along the line II—II of FIG. 1.

In the drawing, shown at 1 is a main body of a reservoir of a generally rectangular form in vertical and horizontal cross-section, whose interior is divided into two chambers 3 and 4 by means of a partition wall 2, with the both chambers 3 and 4 being in communication with each other over the edge 2a of the partition wall 2. The reservoir is secured on a tandem master cylinder 6 by means of a fastener 8 which secures and connects a brake liquid passage 5 formed in the bottom portion of the chamber 3 to a brake liquid supply port 7 formed in the master cylinder 6, while the bottom wall of the other chamber 4 of the reservoir is urged against the upper surface of the peripheral wall of a brake liquid supply port 9 of the master cylinder 6. The chambers 3 and 4 are communicated with pressure chambers (not shown) in the master cylinder 6 respectively, by way of the passage 5, the supply port 7 and a port 10, and by way of a hole 11 formed in the bottom portion of the chamber 4, the supply port 9 and a port 12, so that brake liquid in the chambers 3 and 4 may be supplied to separate brake systems through the tandem master cylinder.

Shown at 13 is a casing which is removably inserted into an opening formed in the bottom portion of the partition wall 2 from outside, with a lead switch 14 and a protective resistor 15 being housed within the casing 13, the lead switch 14 being adapted to open or close an electric circuit due to a magnetic force, and the resistor 15 being connected in parallel with the switch 14 for protecting the switch. The both lead switch 14 and the protective resistor 15 are fixed within the casing 13 by applying a filler material 16 therein. Shown at 17 and 18 are electric wires forming a portion of the electric circuit including a suitable warning device such as a warning light (not shown).

Figure 3:
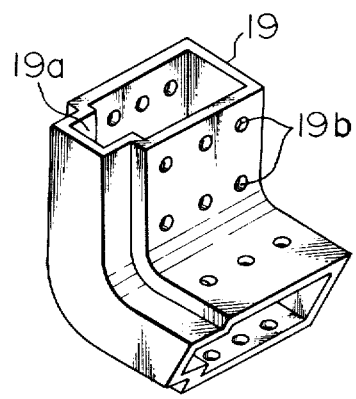
FIG. 3 is a perspective view of a guide.
Figure 4:
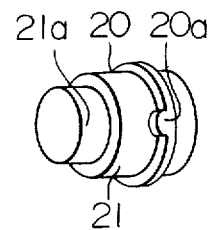
FIG. 4 is a perspective view of a float.

Located within the chambers 3 and 4 are guides 19, 19 having generally rectangular cross-sections as shown in FIGS. 1 and 3. The guides 19, 19 are open at the normal full level of brake fluid in respective chambers 3, 4 and at the center portions of the chambers, while the guides extend generally vertically downwards therefrom, and are curved, on halfway, towards the bottom portion of the partition wall 2 to join same. Slidably located within the guides are floats 21 of a generally cylindrical shape, which is equipped with magnets 20 on their outer peripheral surfaces. The guide 19 is formed with a groove 19a in its one side, while the float 21 is formed on its one side a projecting portion 21 adapted to be slidingly fitted in the groove 19a. In addition, as will be described in more detail hereunder, the aforesaid arrangement is such that magnetic force of the magnets 20, 20 are so designed as being in same direction with each other when the floats 21, 21 are fitted in the guides 19, 19. A projection 20a is formed on one side of the magnet 20, thereby, upon assembly of the magnet 20 to the float 21, the projection 20a of the magnet 20 is disposed towards the projecting portion 21a of the float 21, so that the direction of the magnetic force of the magnet 20 will be determined relative to the projecting portion 21a of the float 21.

Shown at 19b are perforations provided in the wall of the guide 19 for allowing liquid communication therethrough.

In operation, when the levels of brake liquid in the chambers 3, 4 are lowered, then the floats 21, 21 will descend along the guides 19, 19, and when the levels of brake liquid are lowered to a predetermined position, the floats 21, 21 will approach to the lead switch 14 to connect the contacts of the lead switch 14 due to magnetic force of the magnet 20, 20, thereby actuating the warning device.

Meanwhile, the floats 21, 21 descends separately along respective guides, with the descending liquid levels in respective chambers 3, 4. However, in case the both floats approach the lead switch 14 concurrently, and the directions of magnetic force of the magnets of the respective floats are not in same direction (i.e. in opposite directions), then magnetic force of the both magnets are cancelled by each other, thus failing to actuate the warning device. For this reason, the magnets 20, 20 are arranged so as to have magnetic forces in the same direction.

In case a vehicle is inclined, with the liquid level of brake liquid being lowered to some extent (as shown by a line 1a and lines 1'a in FIG. 1), and if the float in the chamber 4 moves along the partition wall 2 as in the prior art device, the float in the chamber 4 will descend a considerable distance according to the left end of the level line 1'a in the chamber 4. In contrast thereto, the floats according to the present invention are so designed as to descend in the center portion of the chambers, thus they will ascend or descend a small distance, and thus the lead switch 14 will not be actuated.

As shown in the chain line 19' in FIG. 1, the guides 19, 19 may be modified to have straight walls without curved portions thereon. This apparently facilitates the manufacture of the device. In this arrangement, the movement of the float in the neighborhood of the lead switch may be minimized by disposing the upper ends of the guides sufficiently apart from the partition wall.

As is apparent from the foregoing description, according to the present invention, at least a portion of the guides 19, 19 are inclined upwardly towards the center portion of the respective chambers 3, 4 and extend from the bottom portion of the partition wall 2. This minimizes the movement of the float 21 which is guided by the guide 19 when a vehicle is inclined, the aforesaid movement being caused by variation in the inclination of the liquid level in the reservoir. Accordingly, unlike the conventional low liquid level warning device, the malfunction of the device may be prevented, such as issuing a warning signal due to the movement of the float when a vehicle is inclined, despite a sufficient amount of brake liquid being contained in the reservoir. Thus there may be achieved improved reliability of the device.

In addition, the guide 19 and the float 21 are formed to have the groove 19a and the projecting portion 21a, which are engageable with each other. Thus, by fitting the magnet 20 on the float 21 in a manner that the direction of magnetic force of the magnet 20 is predetermined relative to the projecting portion 21a of the float 21, the directions of magnetic forces of respective magnets may be brought in same direction when the floats 21, 21 are located within the guides 19, 19 in assembling the device. Then, there may be eliminated troubles such that the lead switch 14 will not be actuated when both floats approach to the switch concurrently due to the magnetic forces having the directions opposing to each other. In addition, maintenance operations including replacement of the floats or the magnets may be easily carried out without paying attention to the direction of magnetic force.

What is claimed is:

1. A low liquid level warning device for use in a brake liquid reservoir supplying a tandem master cylinder or the like in a vehicle hydraulic braking system, said device comprises a lead switch disposed in the bottom portion of a partition wall dividing the interior of the reservoir into two chambers, a float disposed in each of said chambers and having a magnet thereon for actuating said lead switch, a guide disposed in each of the chambers for guiding the corresponding float, at least a portion of each guide extends from the bottom portion of the partition wall upwardly towards the center portion of each chamber in a declined manner, and a warning circuit connected to said lead switch.

2. A low liquid level warning device according to claim 1, in which said guide has a generally rectangular cross-section for receiving the float slidingly therein.

3. A low liquid level warning device according to claim 1, in which each of said guides is adapted to receive the float slidingly therein, and means (19a, 21a) for locating the direction of the float received in the guide are disposed on said guide and on the float.

4. A low liquid level warning device according to claim 3, in which said locating means on the guide is a groove (19a) for receiving a projecting portion (21a) of the float.

5. A low liquid level warning device according to claim 1, in which each of said guides has a portion extending from the bottom portion of the partition wall upwardly towards the center portion of the chamber, a portion extending generally vertically at the center portion of the chamber and a curved portion connecting aforesaid two portions.

6. A low liquid level warning device according to claim 1, in which each of said guides has generally parallel straight walls extending from the bottom portion of the partition wall upwardly in a declined manner.

* * * * *